United States Patent
Goncharuk et al.

(10) Patent No.: US 9,386,113 B1
(45) Date of Patent: Jul. 5, 2016

(54) SYSTEM-INITIATED INTERACTIONS AND NOTIFICATIONS IN A CHAT INFORMATION SYSTEM ON MOBILE DEVICES

(71) Applicants: Artem Goncharuk, Arlington, VA (US); Ilya Gelfenbeyn, Moscow (RU); Pavel Sirotin, Moscow (RU)

(72) Inventors: Artem Goncharuk, Arlington, VA (US); Ilya Gelfenbeyn, Moscow (RU); Pavel Sirotin, Moscow (RU)

(73) Assignee: Speaktoit, Inc., Palo Alto, CA (US)

( * ) Notice: Subject to any disclaimer, the term of this patent is extended or adjusted under 35 U.S.C. 154(b) by 381 days.

(21) Appl. No.: 13/731,034

(22) Filed: Dec. 30, 2012

Related U.S. Application Data

(60) Provisional application No. 61/581,808, filed on Dec. 30, 2011.

(51) Int. Cl.
*G06F 15/16* (2006.01)
*H04L 29/08* (2006.01)
*H04L 12/58* (2006.01)
*G06Q 10/10* (2012.01)

(52) U.S. Cl.
CPC .............. *H04L 67/26* (2013.01); *G06Q 10/107* (2013.01); *H04L 12/585* (2013.01)

(58) Field of Classification Search
CPC ............................ G06Q 10/107; H04L 12/585
USPC ........................................................ 709/206
See application file for complete search history.

(56) References Cited

U.S. PATENT DOCUMENTS

| | | | |
|---|---|---|---|
| 2003/0182391 A1* | 9/2003 | Leber et al. .................... | 709/217 |
| 2005/0273503 A1* | 12/2005 | Carr ..................... | H04L 12/1813 709/219 |
| 2007/0015519 A1* | 1/2007 | Casey ......................... | 455/456.2 |
| 2009/0275349 A1* | 11/2009 | Bae et al. ....................... | 455/466 |
| 2011/0055076 A1* | 3/2011 | Trifiletti ................. | G06Q 20/04 705/39 |
| 2011/0081920 A1* | 4/2011 | Hung et al. ................. | 455/456.3 |
| 2012/0089727 A1* | 4/2012 | Raleigh et al. ................ | 709/224 |
| 2012/0101993 A1* | 4/2012 | Wong ............................. | 707/634 |
| 2012/0214564 A1* | 8/2012 | Barclay et al. .................. | 463/11 |
| 2013/0006663 A1* | 1/2013 | Bertha .................... | G06Q 10/10 705/3 |
| 2013/0067081 A1* | 3/2013 | Liu et al. ........................ | 709/225 |

* cited by examiner

*Primary Examiner* — Chris Parry
*Assistant Examiner* — Weiwei Stiltner
(74) *Attorney, Agent, or Firm* — Georgiy L. Khayet

(57) ABSTRACT

A method for push interaction with a mobile device using a chat interface includes establishing a chat protocol connection between a server and the mobile device, wherein the chat protocol format is used as a part of the push protocol; generating an event on the server; sending a push protocol command relating to the event from the server to the mobile device using the chat protocol connection; in the background, processing the chat protocol request that was packaged within the push protocol command; receiving the response from the mobile device through the chat protocol connection using the pull protocol mode; sending media contents from the server to the client using pull protocol mode; and displaying the media contents on the mobile device.

8 Claims, 5 Drawing Sheets

SYSTEM-INITIATED INTERACTIONS AND NOTIFICATIONS IN A CHAT INFORMATION SYSTEM ON MOBILE DEVICES

CROSS-REFERENCE TO RELATED APPLICATION

This application is a non-provisional application of U.S. Provisional Patent Application No. 61/581,808, filed Dec. 30, 2011, which is incorporated by reference herein in its entirety.

BACKGROUND OF THE INVENTION

1. Field of the Invention

The present embodiments relate to the field of artificial intelligence. More particularly, the present embodiments relate to chat information systems using natural language, and, in particular, to chat information system-activated interactions by using notifications for portable electronic devices that are connected to Internet via mobile or wireless networks.

2. Background of the Related Art

Chat information systems (also commonly called "chatbots") interacting with users in natural language typically operate in the "pull" mode where interactions are initiated by chat information system users. For example, user may greet chatbot or ask chatbot a question.

Chatbots operating on network-connected portable electronic devices, such as smartphones, could interact with users using a "push" approach. In the "push" approach, interactions with users are initiated by chatbot.

Examples of "push" interactions include the following. First, if chatbot is user profile-aware and is connected to user's email and calendar systems, it could remind the user about meetings, appointments, and incoming e-mail messages. Second, chatbot could also perform scheduled repetitive tasks, such as wake user up every day at 7:00 AM or deliver daily news. Furthermore, chatbot could use location of user's mobile device to modify conversation in a location-specific way. For example, by knowing user's time zone, chatbot could suspend "push" messages during nighttime. Awareness about current location could allow chatbot to suggest interesting things to do or visit near the current location.

Standard system interfaces (such as mobile OS push notifications user interfaces), as well as chatbot application-specific user interface could be used to notify users of incoming conversation requests from a chatbot.

Therefore there is a need for new types of user interfaces, system architecture and functions to support system-initiated user interaction with chat information systems working on portable electronic devices.

The task of implementing system-initiated interactions on portable electronic devices faces problems related to embodiments of system architecture, functions and user interfaces due to the limited space available on mobile devices screens, unreliable network connectivity, and availability of additional mobile device functions, such as the Global Positioning System (GPS).

SUMMARY OF THE INVENTION

Accordingly, the present invention is related to a system and method for system-initiated chat interactions using push mechanism that substantially obviates one or more of the disadvantages of the related art.

The present embodiments are a set of methods, architecture, processes, scenarios, and graphical user interfaces reducing or eliminating problems related to implementation of system-initiated interactions and notifications functionality in chat information systems on portable electronic devices connected to Internet via mobile or wireless network.

In one embodiment, there is provided a method for push interaction with a mobile device using a chat interface includes establishing a chat protocol connection between a server and the mobile device, wherein the chat protocol format is used as a part of the push protocol; generating an event on the server; sending a push protocol command relating to the event from the server to the mobile device using the chat protocol connection; in the background, processing the chat protocol request that was packaged within the push protocol command; receiving the response from the mobile device through the chat protocol connection using the pull protocol mode; sending media contents from the server to the client using pull protocol mode; and displaying the media contents on the mobile device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
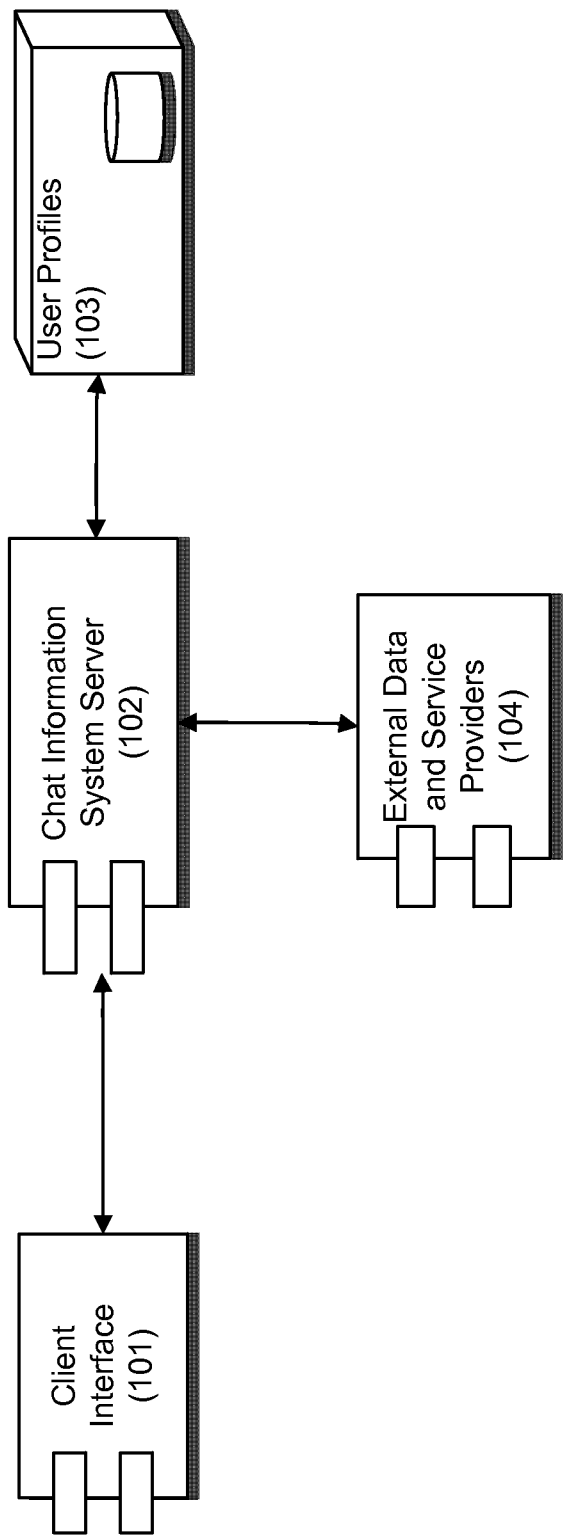
FIG. 1 is a schematic diagram illustrating an embodiment of system component architecture of the chat information system.

FIG. 1 is a schematic diagram illustrating an embodiment of high-level architecture of chat system: Chat Information System Client Interface (101), Chat Information System Server (102) components and External Data and Service Providers (104). User interacts with the chat information system via the Client Interface (101), which connects to the Chat Information System Server (102). Chat Information System Server (102) may be connected to one or more External Data and Service Providers (104). Examples of data providers are e-mail system, calendar system, group discount service system, etc.

User interacts with the Chat Information System Client Interface (101) with natural language (typing of voice). Chat Information System maintains User Profiles (103) to store user preferences and user-specific information, such as history of user's requests.

Figure 2:
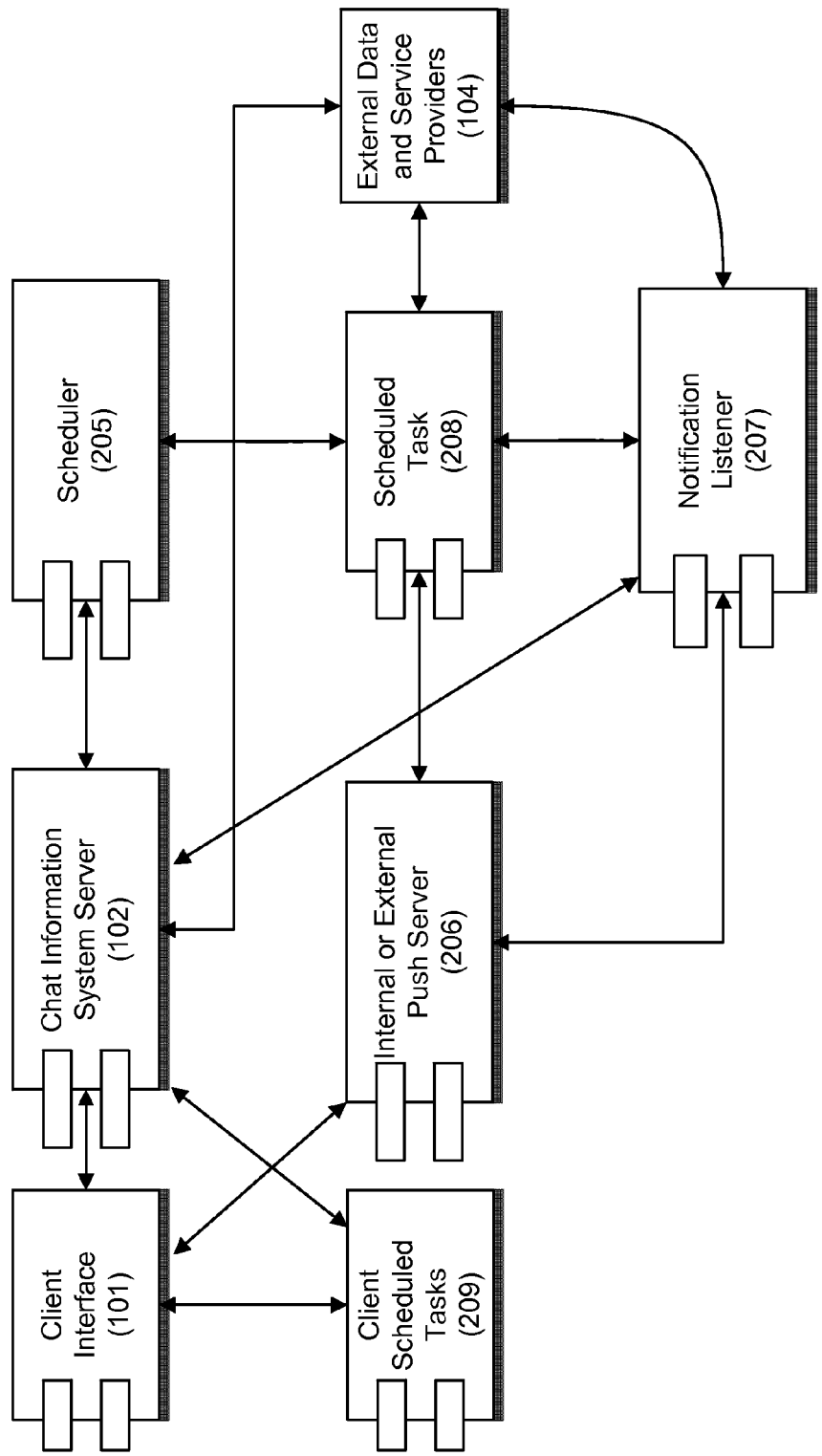
FIG. 2 is a schematic diagram illustrating an embodiment of push architecture of the chat information system.

FIG. 2 is a schematic diagram illustrating an embodiment of chat information system push component architecture. Chat Information System Server (102) interacts with the Scheduler (205) to schedule execution of tasks. The Scheduler (205) interacts with External Data and Service Providers (104) via Scheduler Tasks (208) to execute business logic and prepare a push/notification request to the Chat Information System Client Interface (101). The Scheduled Task (208) uses Internal or External Push Server (206) to deliver push/notification request to the Chat Information System Client Interface (101). The Push Server (206) could be external, for example, provided by the manufacturer of the mobile device operating system, as well as custom-implemented by the chat information system vendor. The pushed information can include a daily brief (e.g., depending on the user's time zone), an agenda, news, local items of interest, itinerary, hotel data, restaurant data, and so on. The contents pushed to the mobile device can be based on the user's location (e.g., from a GPS chip), changes in the user's location, the user's profile, changes in the user's profile, the user's social network profile and changes in it.

External Data and Service providers may supply notification information in the form of "push" or "pull" application programming interfaces (APIs). In the case if the External Data or Service Provider Supports "push" mode of interactions, the Server (102) registers Notification Listener (207) (Web service or other application interface) with the External Data or Service Provider (104). When there is an update/notification, the Provider (104) invokes the Notification Listener (207). In term, the Notification Listener (207) schedules a Scheduled Task (208) with the Scheduler (205) to initiate delivery of the notification to the client (101) via Internal or External Push Server (206). Alternatively, the Notification Listener (207) could interact directly with the Internal or External Push Server (206).

The Client (101) notifies the user about the event (e.g., new email or calendar appointment). When the user opens notification, the Client Interface (101) initiates conversational sequence to deliver notification details. For example, the Client Interface (101) notifies the user about the new email, the user opens the notification. The client initiates the dialog with the Chat Information System Server (102) to read the text of the email to the user and allow the user to respond to the email with the help of the chat information system.

If external data provider does not support "push"-type interactions, the Server (101) schedules tasks in the Scheduler (105) to check updates in the External System (104). The Scheduler (105) initiates Scheduler Tasks (208) based on the schedule. Scheduler Task (208) connects to the External Data and Service Provider(s) (104) and retrieves information updates/new data. The Scheduled Task (208) calculates if the user needs to be notified about the data update. The Scheduled Task (208) initiates a push notification to the user using the Push Server (206). Notification is displayed to the user either using the portable electronic device's operating system capabilities or by the Chat Information System Client Interface (101). If the user opens the notification, the Client (101) may initiate a dialog between the system and the user to retrieve notification details.

In certain cases, Scheduled Tasks (209) could be running on the Client Interface (101) and periodically check the Chat Information System Server (102) for updates.

Push protocols typically have a payload field that could be used by application to transfer application specific format. In the case of the Client Interface (101)—Chat Information System Server (102) interactions, the push payload field contains data formatted using the pull chat protocol format. It could contain, for example: session identifier, text response, voice response, data payload, including new list of system variables and commands.

Figure 3:
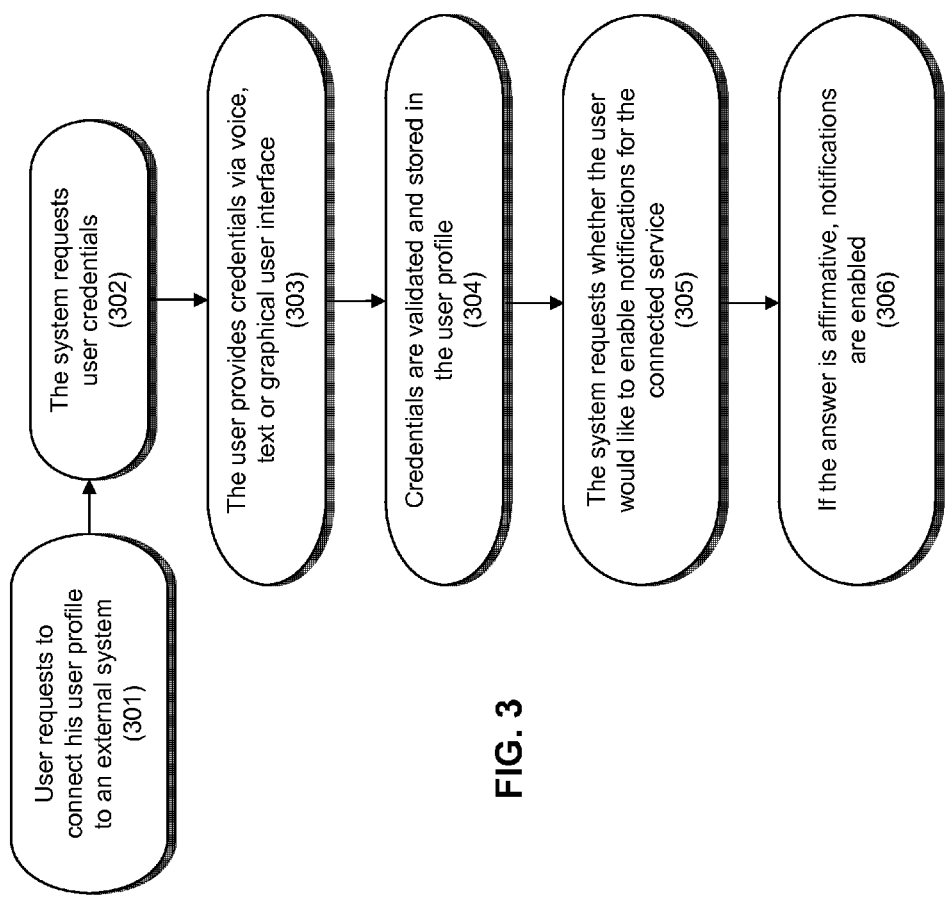
FIG. 3 is a schematic diagram illustrating an embodiment of functional flow to connect to external service and enable notifications.

FIG. 3 is a schematic diagram illustrating a sample functional flow of a chat information system interactions when a user establishes (step 301) a connection to an external system and enables notifications. The user establishes a connection between his User Profile (103) and external providers (104) via natural language-based interactions as well as graphical user interface-based interactions between himself and the Chat Information System Client (101) (steps 302, 303). For example, the user may ask the system to connect to an email account. The system asks for type of email account (e.g., Yahoo! Mail, Gmail, etc) and user credentials. The user provides credentials. The server (102) validates credentials with the external system and securely stores connectivity information in user profile (103) (step 304).

The system asks for the user's confirmation to enable push notifications for the connected service (step 305). The user confirms (step 306).

The server may deliver notifications based on user's profile and usage information. The following scenarios are possible:

1) The server uses user's location information (obtained from the mobile device) to trigger and/or filter notifications. For example, the user asks the system to remind him to buy milk. The system monitors user's location and delivers the notification when the user is close to a grocery store.

2) The server uses User's time zone/local time information to deliver notifications at a particular time period. For example, the user asks the system: "Wake me up at 8 AM tomorrow". By knowing user's time zone, the system will push a notification at 8 AM tomorrow in user's time. Additionally, time zone information could be used to deliver notifications only during specific time of the day. For example, the user may choose to receive notifications from the system only from 8 AM to 8 PM.

3) User's profile information, including but not limited to gender, date of birth, language, contact list, information about connected third-party services could be used to customize notification scope, timing, triggers and content.

For example, the user has connected the chat information system to an email system. The user identifies certain contacts in his contact list as important. The system will notify the user about new emails only from important contacts.

4) The System can use information about Chat Information Client usage, such as installation date and time, client usage frequency, client usage patterns to deliver notifications. For example, if the user has not launched the client in 10 days, the system may send a reminder to the user.

5) The System can support one-time and recurring scheduled notifications. In a one-time notification, the user will ask the system to deliver notification once. For example, "Wake me up at 8 AM tomorrow", "Remind me to pick up dry cleaning on the 19th". In a recurring notification, the user asks the system to deliver notifications on schedule. For example, "Send me weather forecast and a digest of the latest news every morning at 9 AM".

6) The system may adjust notification frequency depending on user's reaction to notifications. For example, if the user dismisses all notifications sent by the system, the system may decrease the frequency of notifications.

7) The system may use combined information retrieved from multiple external services and data from the portable electronic device (e.g., from device's GPS) to trigger notifications. For example, user's profile is connected to a calendaring system and the user has a meeting appointment at l.OAM. Current time is 9.30 AM. Based on user's location (obtained from portable electronic device's location service) and traffic conditions, it will take the user an estimated 45 minutes to get from the current location to the meeting location. The system could (a) notify the user that he may be late for the meeting, (b) suggest rescheduling the meeting.

8) In example 7), by having access to the user calendar, the system could notify other participants of the meeting that the user may be running late. If the other participants of the meeting do not have Chat Information System Client installed of their portable electronic devices, notifications could be delivered via email, instant message or other type of electronic communications.

9) Chat information system client could monitor various services of user's portable electronic devices, including but not limited to location services (GPS), short message service (SMS), Bluetooth service, e-mail service and initiate interactions based on events from such services. For example, the Client could "read" incoming email or short message service messages to the user using "text-to-speech" technology and allow the user to answer the messages.

10) Chat information system service could use notification mechanism to deliver information about system updates, maintenance, important notifications, etc. to a broad range of users/multiple users.

The following types of user interface interactions to deliver notifications are possible:

1) Push notification as supported by mobile platforms. The System server sends a notification to user's mobile device. Notification is shown by the device's operating system to the user. Notification may be accompanied by notification title, notification text, and notification sound. When the user chooses to open notification, the Chat Information System Client Interface (101) is launched.

If the Chat Information System Client Interface (101) application is already running in foreground on user's mobile device, the notification could be shown as:
  An icon or other graphical element on mobile device's desktop
  Item in the status bar
  An icon or other graphical element in the client interface
  Displayed in a popup
  The system may initiate voice output when a notification is received.

2) Notifications can be delivered as text (Simple Message Service) messages to user's mobile device.

3) Notification may be delivered as phone call to user's mobile device. After notification text is read to the user via "Text-to-Speech", user may continue interacting with the system via voice-based chat interface in the scope of the same phone call.

4) If the user is already in the context of the Chat Information System Client Interface (the interface is running in the foreground of the portable electronic device), the notification is displayed in the context of the Chat Information System Client Interface.

Events that are raised by the external systems and the portable electronic device may have different priorities which could determine the method of notification delivery. For example, if the chat information system urgently needs to initiate conversation with the user, interactions could be initiated via a phone call/SMS. If the notification is not urgent, the notification could be shown next time the user opens the application.

Figure 4:
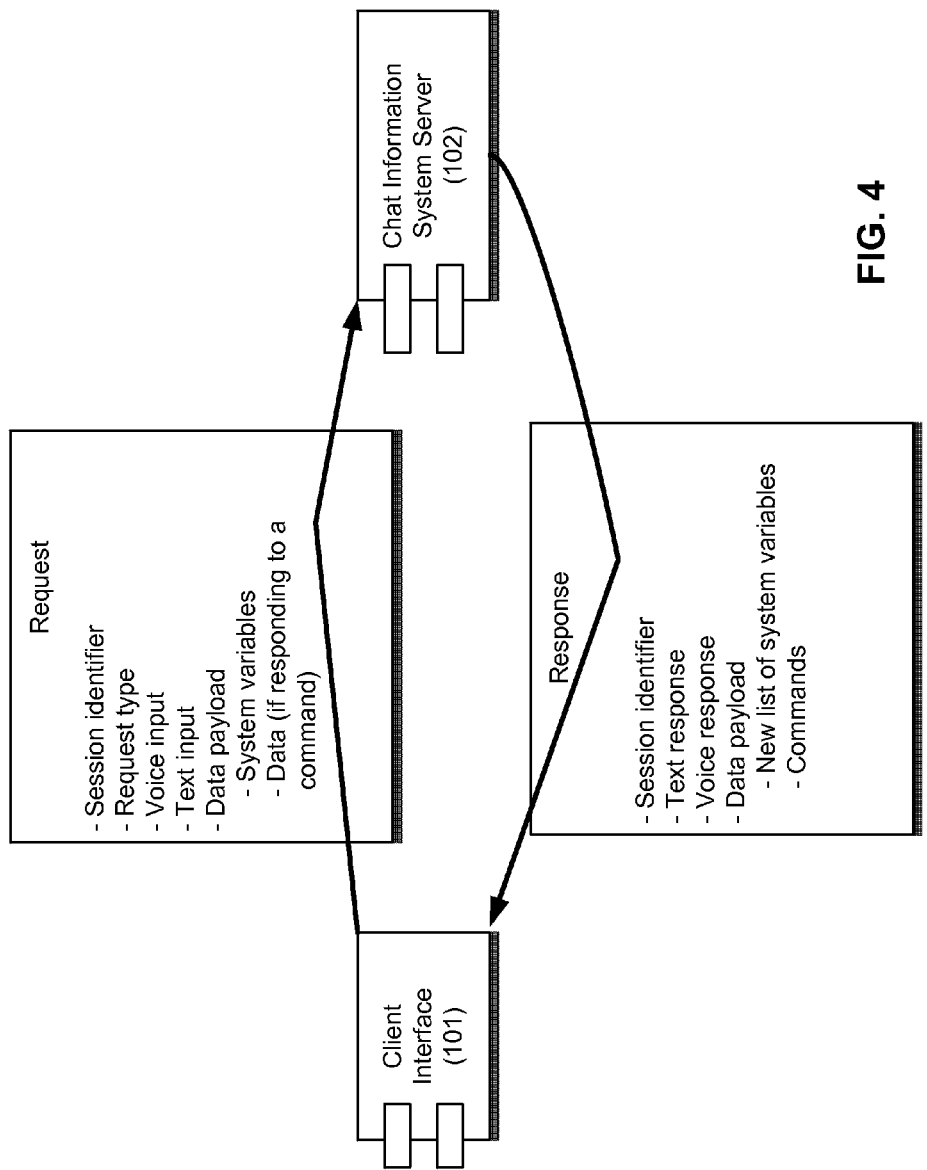
FIG. 4 is a schematic diagram illustrating system operation in request-response mode.

During the user-initiated interactions the System operates in a request-response mode (see FIG. 4). The Client Interface (101) sends a request to the Chat Information System Server (102), which contains:

(1) Session identifier (session is established using a system-dependent protocol, for example, HTTP-based authentication).

(2) Request type. Types of request may include "regular" and "background". Regular requests are sent to the Chat Information System Server (102) when a user performs an explicit action in the Client Interface (101), such as initiating a request to the Chat Information System Server (102) via typing or voice. "Background" requests could be sent from the Client Interface (101) to the Chat Information System Server (102) automatically (e.g. to periodically push client interface variables, such as geolocation, to the Chat Information System Server (102)).

(3) Voice input and text input—the request may contain either voice or text input. If the request contains voice input, speech recognition is performed on the chat information system server directly or using a third-party voice recognition service. The request contains text if voice recognition is performed on the Client Interface (101).

(4) Data payload—the request could contain an optional data payload section, including:
  (a) System variables—the client could have a set of client interface-specific variables that need to be communicated to the Chat Information System Server (102), for example, version of the client interface. A subset of such variables could be defined and re-defined in server responses.
  (b) Data—if Client Interface (101) is responding to a command from the Chat Information System Server (102) it could pass results of the command execution on the client interface to the server. An example of such command is the geolocation command. If the Chat Information System Server (102) instructs the Client Interface (101)*to* determine geolocation, the Client Interface (101) performs geolocation operation using built-in capabilities and passes results (latitude, longitude) or an error code to the Chat Information System Server (102) in the data field of the response.

The typical response from the Chat Information System Server (102) contains:

(1) Session identifier (session is established using a system-dependent protocol, for example, HTTP-based authentication). This parameter is optional.

(2) Text and/or voice response that is shown and/or played back to the User.

(3) Data payload which includes:
  (a) New list and/or changes to the existing list of client variables, and
  (b) A list of commands that need to be executed on the Client Interface (101) with all required command parameters.

During the system-initiated interaction, a client-specific push mechanism (for example, Google GCM, Apple Push Notifications, periodic pull from the client, push via persistent network connection from the server to the client) is used. The push message to the client interface contains:

(1) Text message to the user (optional);
(2) Sound that needs to be played back to the user when the message is received (optional);
(3) Data payload. Data payload is formatted using the response format, described above.

An example of the push scenario is provided below:

1) Chat Information System Server (102) initiates a push to the Client Interface (101) with the command to send a "background" request to the server "What is the weather like?"
2) The Client Interface (101) receives the push message in the background and activates itself on the device (starts running in the foreground)
3) The Client Interface (101) sends a "background" request to the Chat Information System Server (102) with the question "What is the weather like?"
4) Chat Information System Server (102) responds with a regular response format, described above, with the current weather conditions and weather forecast.
5) Client Interface (101) displays/reads the answer to the user.

Use of server response format in the system-initiated communications allows simplifying client implementation and access full set of client interface capabilities via client commands.

When the Chat Information System Server (102) initiates an interaction with the user via the Client Interface (101), it frequently needs to generate a human readable text response/message that is tailored to the user's needs. When the message is generated, the following needs to take into account:

(1) Knowledge of the user's profile—language preferences, location, communication preferences (e.g. user prefers not to be contacted at night time)
(2) Knowledge of the conversation context that the user had with the system All this information is available via the Chat Information System server (102).

In order to leverage this information and context, Scheduled Tasks (208) executed on the Scheduler (205) contain a command (text) and user account identification information that is used to initiate a request on the chat information system server (102). The sequence of interaction is as follows:

1) Chat Information System (102) instructs the Scheduler (205) to schedule as task
2) Scheduler (205) schedules a Scheduled Task (208) with an appropriate execution schedule, user and context information.
3) When task is due, Scheduler (205) initiates execution of the Scheduled Task (208)
4) Scheduled Task (208) interacts with the Chat Information System (102) on behalf of the target user.
5) The request is processed in the Chat Information System (102) similar to processing of the regular request from Client Interface (101). Chat Information System (102) uses user account and profile information, including user preferences to execute the request and generate a response. Response contains major response fields, described in FIG. 4, including response text, voice response, new list of system variables, and commands.
6) The Chat Information System (102) passes the result back to the Scheduled Task (208).
7) Scheduled Task (208) retrieves Scheduled Task (108) analyzes to which of user's device(s) the push should be sent to.
8) Scheduled Task (208) initiates the push(es) via the Internal or External Push Server (206).
9) Internal or External Push Server (206) delivers the push to one or more (if the User has multiple) Client Interfaces (101).

An example of push communications and Scheduler-Chat information system interactions is shown below. One of the functionalities of the chat information system can be to provide daily briefings to the user, which might contain current weather and weather forecast, the user's agenda for the day and top news headlines. In this example, it is assumed that the user is typing the input text in. Voice-enabled interactions will behave in a similar way.

1. The user asks the system via the Client Interface (101) to schedule a daily brief, "Please schedule a daily brief for me". Client interface (101) sends a Request object contains:
    Session ID
    Request type="regular"
    Text input="Please schedule a daily brief for me"
    Standard system variables, such as user type.
2. The system responds with the text "At what time would you like to receive the brief?".
    Response object contains:
    Session ID
    Text response="Which time would you like to receive the brief"
    Standard system variables, such as user type.
3. The user replies: "9:00 AM on weekdays"
    Request object contains:
    Session ID
    Request type="regular"
    Text input="9:00 AM on weekdays"
    Standard system variables, such as user type.
4. After receiving this request, Chat Information System Server (102) instructs the Scheduler (205) to schedule daily brief for the user. The Scheduler (205) creates a Scheduled Task (208) that contains:
    User identifier/user ID
    User device ID
    Scheduling information (9:00 AM on weekdays)
    Command="system.prepareDailyBrief"
5. At 9:00 AM on a weekday, the Scheduler (205) activates the Scheduled Task (208)
6. The Scheduled Task (208) establishes communication with the Chat Information System (102) and sends a request on behalf of the user from the Scheduled Task (208). Scheduled Task (208) uses Chat Information System (102) to prepare push text, which is tailored to the user.

The Scheduled task passes the user ID to the Chat Information System (102) to process these requests on User's behalf. The Chat Information System (102) provides a response object that needs to be sent to the user. Scheduled Task initiates push communication to the user via External or Internal Push Server (206). The push request contains:
    User push identifier or other identifier of user's device
    Push title and text (retrieved from the Chat Information System Server (102))
    Payload—payload is provided in the Chat Information System Server response format to be directly processed by the Client Interface. Text response will be shown to the user (or in the case of Voice Response present be played back to the user); commands will be executed appropriately on the client interface.
    Text response="Preparing your daily brief . . . "
    Command:
        Command type="background-request"
        Command parameters:
            Text input="Show daily brief"

7. External or Internal Push Server (206) sends and delivers push request to the Client Interface (101).

8. The user opens the push request. Client Interface (101) is launched upon opening of the push request.

The Client Interface (101) displays response text ("Preparing your daily brief . . . ") and processes payload of the push request and executes the command to send background request to the server. The request is sent silently in the background to the Chat Information System Server (102) without showing the request details to the user. The request contains:
    Session ID
    Request type="background"
    Text input="Show daily brief"
    Standard system variables, such as user type.

Starting at this point, the interactions moves from the push mode to the regular request-response protocol.

9. The Chat Information System Server (102) processes the request and first retrieves user's agenda. The Session ID or User ID (if request is made directly from a Scheduled Task (208)) is used to retrieve user profile which contains keys/sessions that enable Server's (102) communications with External Data and Service Providers (104), such as calendar services. The requests to calendar services are executed on user's behalf. The System retrieves calendar information and send it back to the user. The response contains:
    Session ID
    Text response="You have a meeting with John Smith at 10:00 AM today at Radisson hotel."
    Standard system variables, such as user type.
    Command:
        Command type="background-request"
        Command parameters:
            Text input="Show weather"
            Delay=8 seconds 10. The Client Interface (101) receives and displays the result to the User. After waiting for 8 seconds, as specified in the command Delay parameter, Client Interface (101) initiates a background request to the server with the text "Show weather".

11. The Chat Information System Server (102) processes the request and issues a response containing a command to determine user's location. The response contains:
    Session ID
    Standard system variables, such as user type.
    Command:
        Command type="geolocation"
        Command parameters:
            Precision=1 mile 12. The Client Interface (101) receives the response and initiates geolocation determination. After geolocation is determined, Client Interface (101) sends a background request to the Chat Information System Server (102) containing:
    Session ID
    Request type="background"
    Standard system variables, such as user type.
    Commands
        Command type: "geolocation"
        Result: latitude and longitude data 13. The Chat Information System Server (102) processes the location data received in the client response and contacts External Data and Service Providers (104) to get weather information for specified location. After obtaining weather information, Chat Information System (102) issues a response to the Client Interface (102) containing:
    Session ID
    Text response="Today is sunny, 45-55° F. Tomorrow— also sunny, but warmer 50-60° F."
    Standard system variables, such as user type.
    Command:
        Command type="background-request"
        Command parameters:
            Text input="Show top news"
            Delay=10 seconds 14. The client interface (101) displays the weather information from the response and after waiting 10 seconds issues a background request to retrieve top news. Processing of top news is analogous to prior examples.

Figure 5:
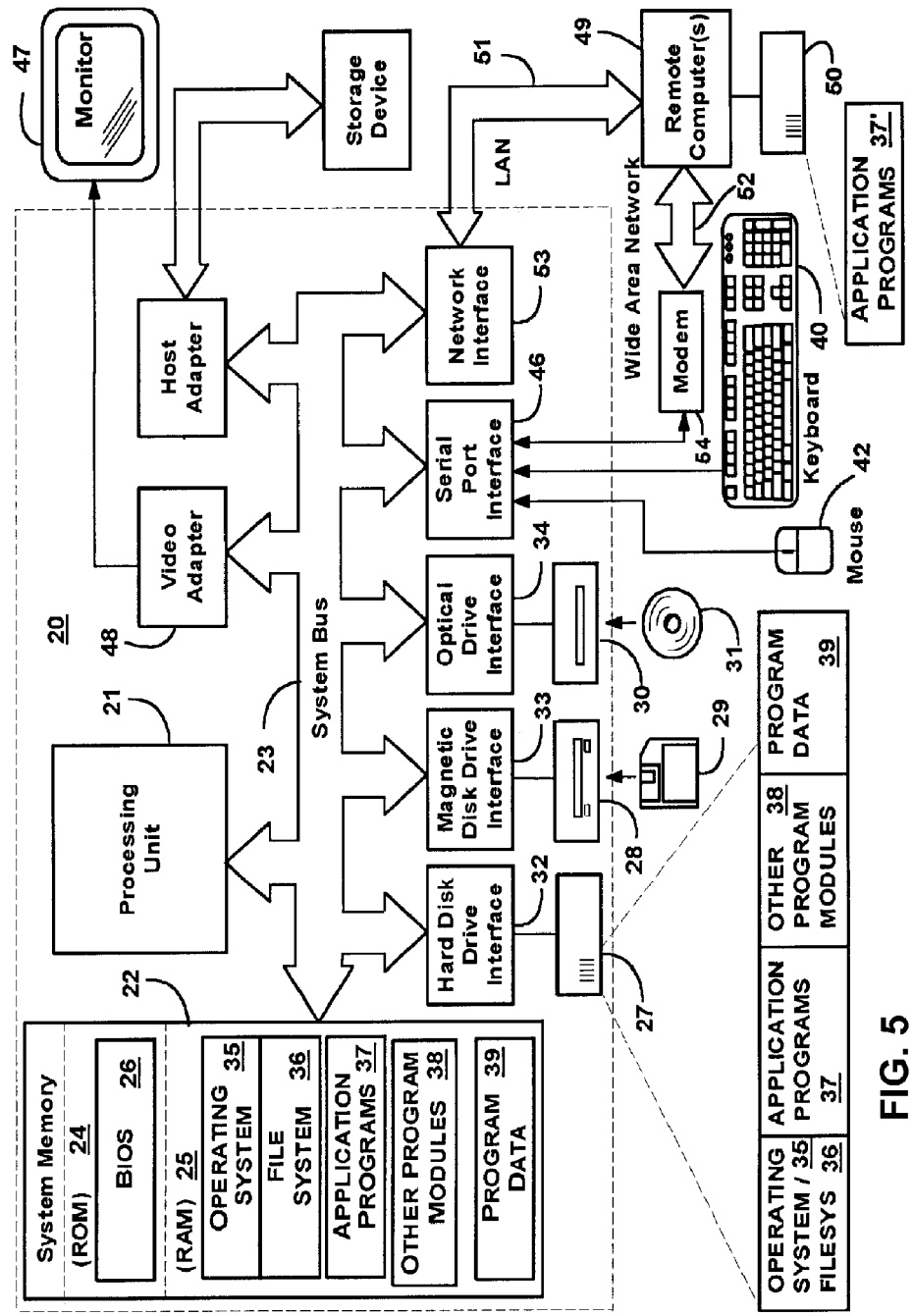
FIG. 5 illustrates a schematic of an exemplary computer system that can be used for implementation of the invention.

With reference to FIG. 5, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The personal computer 20 may further include a hard disk drive 27 for reading from and writing to a hard disk, not shown in the figure, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide a non-volatile storage of computer readable instructions, data structures, program modules/subroutines, such that may be used to implement the steps of the method described herein, and other data for the personal computer 20.

Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices, such as speakers and printers.

The personal computer 20 may operate in a networked environment using logical connections to one or more remote computers 49. The remote computer (or computers) 49 may be represented by a personal computer, a server, a router, a network PC, a peer device or other common network node, and it normally includes many or all of the elements described above relative to the personal computer 20, although only a memory storage device 50 is illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used. Such computers as described above can be used in conventional networks, e.g. the Internet, local area networks, regional networks, wide area networks, and so forth. These networks can link various resources, such as user computers, servers, Internet service providers, telephones connected to the network and so on.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for push interaction with a mobile device using a chat interface, the method comprising:
   establishing a chat protocol connection between a server and the mobile device;
   obtaining, by the server, one or more updates on events from an external service provider, wherein the one or more updates are obtained in accordance with a predetermined schedule;
   monitoring one or more parameters associated with the mobile device, wherein the one or more parameters associated with the mobile device include at least a geographical location of the mobile device and a time associated with the mobile device;
   based on the monitoring, identifying, by the server, an event and one or more parameters associated with the event, wherein the one or more parameters associated with the event include at least a geographical location associated with the event and a time associated with the event, wherein the event is generated by the external service provider, and wherein the event is not generated by nor immediately associated with an input or a command of a user of the mobile device;
   based on the one or more parameters associated with the mobile device and the one or more parameters associated with the event, identifying, by the server, a possibility for the user to get to the event in time;
   sending a push protocol command relating to the event from the server to the mobile device using a push protocol mode, wherein the push protocol command causes the mobile device to notify the user about the event by displaying a notification associated with the event, wherein the notification at least informs about the possibility for the user to get to the event in time and includes a suggestion to reschedule the event;
   receiving by the server a response from the mobile device through the chat protocol connection using a pull protocol mode, wherein the response is generated based on the push protocol command and includes a session identifier, a request type, and data payload, wherein the request type includes a regular type or a background type;
   generating media contents by a chat information system of the server based on the response and the request type, wherein the media contents include data obtained from the external service provider;
   formatting the media contents using a pull chat protocol format;
   sending the media contents from the server to the mobile device using the pull protocol mode;
   based on the one or more parameters associated with the event, determining, by the server, participants of the event; and
   based on the identifying of the possibility for the user to get to the event in time, sending, by the server, one or more notifications to the participants of the event, the one or more notifications informing at least about the possibility for the user to get to the event in time, wherein the one or more notifications are sent to one or more electronic devices associated with the participants of the event.

2. The method of claim 1, wherein the response includes time zone information of the mobile device.

3. The method of claim 1, wherein the response includes social network profile information of the user of the mobile device.

4. The method of claim 1, wherein the response includes contact information stored on the mobile device.

5. The method of claim 1, wherein the media contents include any of news, daily brief, weather, and personal calendar information.

6. The method of claim 1, wherein the media contents are in a text format.

7. The method of claim 1, wherein the push protocol command is a field within the chat protocol.

8. A system for push interaction with a mobile device using a chat interface, the system comprising:
   a server including at least one processor and a memory storing computer-executable instructions which, when executed by the at least one processor, cause the server to:
      establish a chat protocol connection between a server and the mobile device;
      obtain, by the server, one or more updates on events from an external service provider, wherein the one or more updates are obtained in accordance with a predetermined schedule;
      monitor one or more parameters associated with the mobile device, wherein the one or more parameters associated with the mobile device include at least a geographical location of the mobile device and a time associated with the mobile device;

based on the monitoring, identify, by the server, an event and one or more parameters associated with the event, wherein the one or more parameters associated with the event include at least a geographical location associated with the event and a time associated with the event, wherein the event is generated by the external service provider, and wherein the event is not generated by nor immediately associated with an input or a command of a user of the mobile device;

based on the one or more parameters associated with the mobile device and the one or more parameters associated with the event, identify a possibility for the user to get to the event in time;

send a push protocol command relating to the event from the server to the mobile device using a push protocol mode, wherein the push protocol command causes the mobile device to notify the user about the event by displaying a notification associated with the event, wherein the notification at least informs about the possibility for the user to get to the event in time and includes a suggestion to reschedule the event;

receive by the server a response from the mobile device through the chat protocol connection using a pull protocol mode, wherein the response is generated based on the push protocol command and includes a session identifier, a request type, and data payload, wherein the request type includes a regular type or a background type;

generate media contents by a chat information system of the server based on the response and the request type, wherein the media contents include data obtained from the external service provider;

format the media contents using a pull chat protocol format;

send the media contents from the server to the mobile device using the pull protocol mode;

based on the one or more parameters associated with the event, determine participants of the event; and based on the identifying of the possibility for the user to get to the event in time, send one or more notifications to the participants of the event, the one or more notifications informing at least about the possibility for the user to get to the event in time, wherein the one or more notifications are sent to one or more electronic devices associated with the participants of the event.

* * * * *